United States Patent
Cho

(10) Patent No.: US 9,550,408 B2
(45) Date of Patent: Jan. 24, 2017

(54) DOOR FRAME FOR VEHICLE WITH IMPROVED ANTI-CORROSIVE PERFORMANCE AND METHOD OF MANUFACTURING THE SAME

(71) Applicant: Hyundai Motor Company, Seoul (KR)

(72) Inventor: Min-Woo Cho, Ulsan (KR)

(73) Assignee: Hyundai Motor Company, Seoul (KR)

( * ) Notice: Subject to any disclaimer, the term of this patent is extended or adjusted under 35 U.S.C. 154(b) by 58 days.

(21) Appl. No.: 14/570,359

(22) Filed: Dec. 15, 2014

(65) Prior Publication Data

US 2016/0089967 A1    Mar. 31, 2016

(30) Foreign Application Priority Data

Sep. 26, 2014  (KR) .................. 10-2014-0129170

(51) Int. Cl.
*B62D 21/00* (2006.01)
*B60J 5/04* (2006.01)

(52) U.S. Cl.
CPC .................. *B60J 5/0402* (2013.01)

(58) Field of Classification Search
CPC .............................. B60J 10/085; B60J 5/0402
USPC ....................................... 296/146.5
See application file for complete search history.

(56) References Cited

U.S. PATENT DOCUMENTS

| 4,719,038 A * | 1/1988 | Sobata .................. B23K 35/226 106/1.12 |
| 5,317,835 A * | 6/1994 | Dupuy ................... B60J 10/235 49/377 |
| 8,866,044 B2 * | 10/2014 | Sachdev ................ B23K 26/38 219/121.72 |
| 2012/0174491 A1 | 7/2012 | Clark et al. |

FOREIGN PATENT DOCUMENTS

| JP | 11-192842 A | 7/1999 |
| JP | 2012-121027 A | 6/2012 |
| KR | 10-2014-0055752 A | 5/2014 |

* cited by examiner

*Primary Examiner* — Pinel Romain
(74) *Attorney, Agent, or Firm* — Morgan, Lewis & Bockius LLP

(57) ABSTRACT

A door frame for a vehicle having improved anti-corrosive performance, and a method of manufacturing the door frame may includes: a three-stage superimposed portion which has a structure in which an upper steel plate layer, an intermediate steel plate layer, and a lower steel plate layer are superimposed, and in which a sealer for anti-corrosive performance is applied between the upper steel plate layer and the intermediate steel plate layer; and a curved portion which is formed at an upper side of the intermediate steel plate layer at a first end of the three-stage superimposed portion to prevent the applied sealer from being exposed to the outside, thereby improving anti-corrosive performance, and a method of manufacturing the door frame.

11 Claims, 3 Drawing Sheets

DOOR FRAME FOR VEHICLE WITH IMPROVED ANTI-CORROSIVE PERFORMANCE AND METHOD OF MANUFACTURING THE SAME

CROSS-REFERENCE TO RELATED APPLICATIONS

The present application claims priority to Korean Patent Application No. 10-2014-129170, filed on Sep. 26, 2014, the entire contents of which is incorporated herein for all purposes by this reference.

BACKGROUND OF THE INVENTION

Field of the Invention

The present invention relates to a door frame for a vehicle having improved anti-corrosive performance, and a method of manufacturing the door frame, and more particularly, to a door frame for a vehicle, which includes a sealer between steel plate layers of the door frame, and a curved portion, thereby improving anti-corrosive performance of the door frame for a vehicle, and a method of manufacturing the door frame.

Description of Related Art

In a vehicle, a door is classified into a frame type door, a frameless type door, and a full door type door, the frame type door among the doors has excellent characteristics in that sealing between the door and a body is excellent, thereby preventing noise and water leakage.

The frame type door is a door frame 10 for a vehicle as described in FIG. 1, and generally manufactured by a roll forming process, and a cross section taken along line A-A' of the manufactured door frame for a vehicle has a structure in which steel plates are superimposed as illustrated in FIG. 2.

In particular, in the case of a three-stage superimposed portion 30 in which three sheets of steel plate layers such as an upper steel plate layer 20, an intermediate steel plate layer 21, and a lower steel plate layer 22 are superimposed based on the A-A' cross section, electrodeposition coating is performed after completion of a roll forming process in order to improve anti-corrosive performance of the door frame. However, although the electrodeposition coating is performed, an electrodeposition liquid does not easily flow into the three-stage superimposed portion 30, and as a result, corrosion may easily occur in the three-stage superimposed portion 30 of the door frame 10 for a vehicle due to inflow of moisture or the like when the door frame 10 for a vehicle is actually used.

In order to solve the aforementioned problem with corrosion, a method of precisely applying a sealer outside the superimposed portion of the formed door frame has been developed, but there is a problem in that costs are high, such that economic efficiency deteriorates.

Otherwise, the door frame has been manufactured by using a deviation plating steel plate as a high corrosion resistant anti-corrosive steel plate, but costs are also excessively increased, and as a result, there is difficulty in commercial availability.

Accordingly, the present inventor intends to develop a door frame for a vehicle and a method of manufacturing the door frame which may minimize an increase in costs, and may improve anti-corrosive performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door frame for a vehicle, which includes a sealer between steel plate layers that are superimposed in the door frame for a vehicle, and includes a curved portion that prevents the sealer from being exposed to the outside, thereby improving anti-corrosive performance or the like, and a method of manufacturing the door frame.

In an aspect of the present invention, a door frame for a vehicle may include a three-stage superimposed portion which may have a structure in which an upper steel plate layer, an intermediate steel plate layer, and a lower steel plate layer are superimposed, and in which a sealer for anti-corrosive performance is applied between the upper steel plate layer and the intermediate steel plate layer, and a curved portion which is formed at an upper side of the intermediate steel plate layer at a first end of the three-stage superimposed portion to prevent the applied sealer from being exposed to the outside.

A cross section of the curved portion may have a 'z,21' shape.

A width (a) of a cross section of the curved portion is approximately 2.5 mm, and a depth (b) of the cross section of the curved portion is approximately 0.25 mm.

The curved portion starts at a portion (c) that is spaced apart from a first end of the intermediate steel plate layer by approximately 16.5 mm to approximately 17.5 mm.

In another aspect of the present invention, a method of manufacturing a door frame for a vehicle may include a first step of forming a curved portion which prevents a sealer from being exposed to the outside by a roll forming process for manufacturing the door frame for the vehicle, a second step of applying the sealer onto an intermediate steel plate layer, a third step of forming a three-stage superimposed portion by allowing an upper steel plate layer and the intermediate steel plate layer to be attached to each other by the roll forming process so that the sealer, which is applied onto an upper portion of the intermediate steel plate layer, is compressed and widely applied between the upper steel plate layer and the intermediate steel plate layer, a fourth step of finishing forming the door frame for a vehicle by the roll forming process, and a fifth step of coating the formed door frame with an electrodeposition liquid.

In the first step, a cross section of the curved portion is formed in a '⊏' shape.

In the first step, a width (a) of the cross section of the curved portion is 2.5 mm, and a depth (b) of the cross section of the curved portion is approximately 0.25 mm.

In the first step, the curved portion starts at a portion (c) that is spaced apart from a first end of the intermediate steel plate layer by approximately 16.5 mm to approximately 17.5 mm.

In the second step, a position at which the sealer is applied is a position (d) that is spaced apart from a first end at an upper side of the intermediate steel plate layer by approximately 13 mm.

In the second step, the application of the sealer is performed by using a sealer application gun.

In the second step, an application rate of the sealer is approximately 0.12 cc to approximately 0.15 cc.

As described above, the present invention, which has the aforementioned configuration, includes the sealer in the three-stage superimposed portion, and includes the curved portion that prevents the sealer from being exposed to the outside, thereby improving anti-corrosive performance of the door frame for a vehicle, and maintaining a degree of completion of an external appearance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
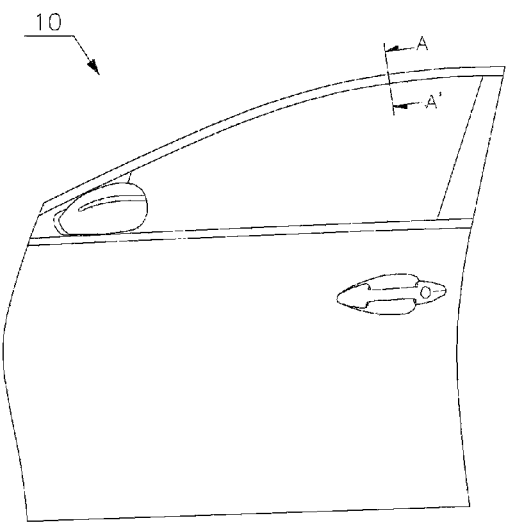
FIG. 1 is a front view of a door frame for a vehicle.
Figure 2:
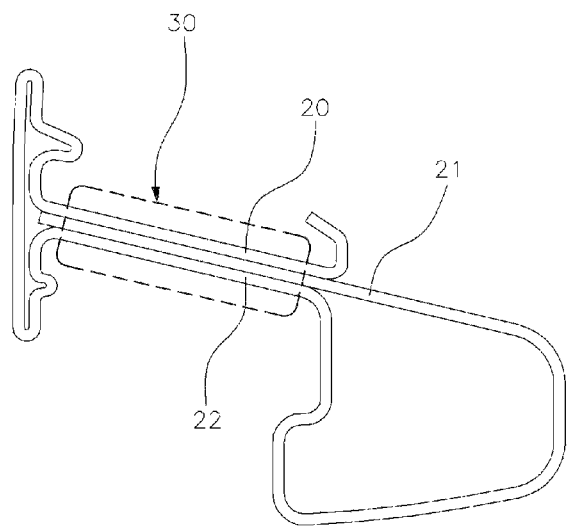
FIG. 2 is a cross-sectional view of part A-A' of the door frame for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the drawings and the like.

The present invention relates to a door frame for a vehicle in which a sealer is applied in a superimposed portion so as to improve anti-corrosive performance, and a method of manufacturing the door frame, and in one aspect, the present invention relates to a door frame for a vehicle.

Figure 3:
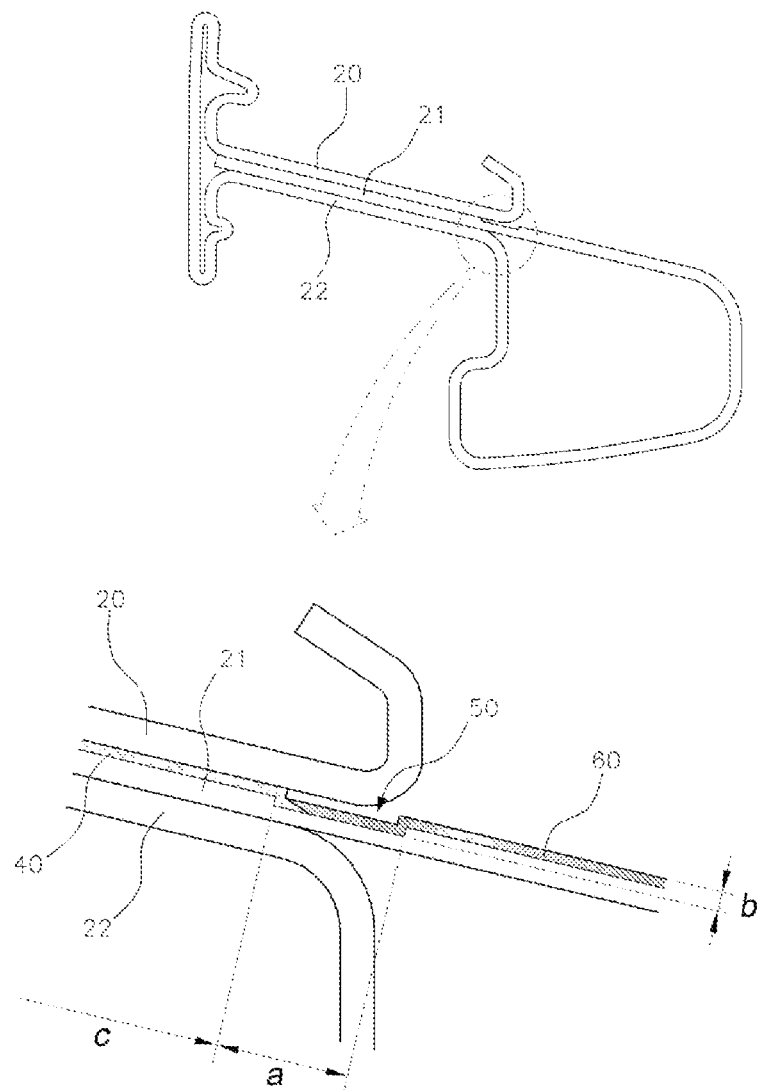
FIG. 3 is a cross-sectional view of part A-A' of the door frame for a vehicle according to an exemplary embodiment of the present invention.

As illustrated in FIG. 3, the present invention is characterized by including a sealer 40 applied between a three-stage superimposed portion 30 in order to prevent corrosion or the like from occurring in the three-stage superimposed portion 30 of a door frame 10 for a vehicle, and particularly, characterized by including the sealer 40 applied between an upper steel plate layer 20 and an intermediate steel plate layer 21.

More specifically, the door frame 10 for a vehicle of the present invention may have a structure of the three-stage superimposed portion 30 in which the upper steel plate layer 20, the intermediate steel plate layer 21, and a lower steel plate layer 22 are superimposed, the sealer 40 for anti-corrosive performance may be applied between the upper steel plate layer 20 and the intermediate steel plate layer 21, and a curved portion 50, which prevents the applied sealer 40 from being exposed to the outside and prevents external appearance characteristics from deteriorating due to the exposure of the sealer, may be positioned at an upper side of the intermediate steel plate layer 21. In this case, a cross section of the curved portion 50 may have a 'ㄇ' shape in order to inhibit the sealer from being exposed to the outside.

Here, it is difficult to apply an electrodeposition liquid 60 in the three-stage superimposed portion 30, that is, between the upper steel plate layer 20 and the intermediate steel plate layer 21, but the sealer 40 may be easily applied in accordance with the present invention. The electrodeposition liquid 60 is applied by electrodeposition coating after the door frame 10 is completed by a roll forming process, and the respective steel plate layers are tightly attached to each other in the three-stage superimposed portion 30 of the completed door frame 10, such that the electrodeposition liquid 60 may not easily flow thereinto, but the sealer 40 is applied during the roll forming process for manufacturing the door frame 10, and as a result, the sealer 40 may be applied between the steel plate layers.

In a case in which the curved portion 50 is not present in the door frame 10 for a vehicle, a part of the sealer 40, which is applied between the upper steel plate layer 20 and the intermediate steel plate layer 21, may partially escape and may be exposed to the outside from the three-stage superimposed portion 30 that is formed by a process of allowing the upper steel plate layer 20 and the intermediate steel plate layer 21 to be tightly attached and superimposed during the roll forming process. In a case in which the sealer 40 is exposed to the outside as described above, a quality deterioration phenomenon, in which a degree of completion of an external appearance, of the door frame 10 which is noticeably degraded may occur.

In order to prevent the quality deterioration phenomenon, the curved portion 50 may be positioned at a portion where the three-stage superimposed portion 30 ends. More specifically, based on the cross section, a start position of the curved portion 50 may be an upper side of the intermediate steel plate layer 21 before the three-stage superimposed portion 30 is separated into the respective steel plate layers, and an end position of the curved portion 50 may be an upper side of the intermediate steel plate layer 21 where the upper steel plate layer 20 and the lower steel plate layer 22 are separated from the intermediate steel plate layer 21.

In more detail, a width (a) of the cross section of the curved portion 50 may be about 2.5 mm, and a depth (b) of the cross section of the curved portion 50 may be about 0.25 mm. In addition, based on the type of vehicle, the curved portion 50 may start from a portion (c) that is spaced apart from one end of the intermediate steel plate layer 21 by about 16.5 mm to about 17.5 mm, and the curved portion 50 may start from a portion (c) that is spaced apart from one end of the intermediate steel plate layer 21 by about 16.5 mm. Further, an application tolerance of the sealer 40 applied on the intermediate steel plate layer 21 and the curved portion 50 may be about 1.5 mm.

Here, in a case in which all of the portions of the curved portion 50 are formed to deviate from the three-stage superimposed portion 30 based on the cross section, the sealer 40, which is applied between the upper steel plate layer 20 and the intermediate steel plate layer 21, is exposed to the outside before the sealer 40 enters the curved portion 50, such that there is no reason to form the curved portion 50. On the contrary, in a case in which all of the portions of the curved portion 50 are present in the three-stage superimposed portion 30, a large amount of the sealer 40, which is applied between the upper steel plate layer 20 and the intermediate steel plate layer 21, enters the curved portion 50, such that the sealer 40 is not sufficiently applied in the three-stage superimposed portion 30 due to an insufficient amount of the sealer 40 to be applied.

However, in a case in which a part of the curved portion 50 based on the cross section is positioned in the three-stage superimposed portion 30 and the other part of the curved portion 50 is positioned outside the three-stage superimposed portion 30 as described in an exemplary embodiment of the present invention, even if the sealer 40, which is applied by being compressed during the roll forming process, leaks out between the upper steel plate layer 20 and the intermediate steel plate layer 21, because the sealer 40, which has leaked out, is received in the curved portion 50 that is recessed and elongated, the sealer 40 may be prevented by the curved portion 50 from being exposed to the outside. In addition, in a case in which the door frame 10 is subjected to electrodeposition coating with the electrodeposition liquid 60 later, the curved portion 50, which is partially coated by the sealer 40, may be coated with the electrodeposition liquid 60 to have a double coating structure, and the sealer 50, which is received in the curved portion 50, is also covered when the electrodeposition liquid 60 is additionally applied, thereby improving anti-corrosive performance of the door frame at low costs, and preventing quality deterioration.

Therefore, based on the cross section, a part of the curved portion 50 may be positioned in the three-stage superimposed portion 30, and the other part of the curved portion 50 may be positioned outside the three-stage superimposed portion 30.

Hereinafter, in another aspect, the present invention relates to a method of manufacturing the door frame for a vehicle, which has improved anti-corrosive performance.

The method of manufacturing the door frame for a vehicle of the present invention may include: a first step of forming the curved portion 50 that prevents the sealer 40 from being exposed to the outside by the roll forming process for manufacturing the door frame for a vehicle, a second step of applying the sealer 40 onto the upper portion of the intermediate steel plate layer 21, a third step of forming the three-stage superimposed portion 30 by allowing the upper steel plate layer 20 and the intermediate steel plate layer 21 to be tightly attached to each other by the roll forming process, so that the sealer 40, which is applied onto the upper portion of the intermediate steel plate layer 21, is compressed and widely applied between the upper steel plate layer 20 and the intermediate steel plate layer 21, a fourth step of finishing forming the door frame for a vehicle by the roll forming process, and a fifth step of coating the formed door frame with the electrodeposition liquid 60.

In the first step, the cross section of the curved portion 50 may have a 'z<' shape so that the sealer 40 which leaks out when the upper steel plate layer 20 and the intermediate steel plate layer 21 are tightly attached to each other by the process of the third step is collected later so as to effectively prevent the sealer 40 from being exposed to the outside, and to allow the electrodeposition liquid 60 to be additionally applied onto the sealer 40.

Regarding the position of the curved portion, a part of the cross section of the curved portion 50 is positioned in the three-stage superimposed portion 30, and the other part of the cross section of the curved portion 50 is positioned outside the three-stage superimposed portion 30, such that even if the sealer 40, which is applied between the upper steel plate layer 20 and the intermediate steel plate layer 21, leaks out to the outside by a compression process of the roll forming process, the sealer 40 is collected in the curved portion 50, thereby preventing the sealer 40 from being exposed to the outside. In addition, when the door frame 10 is subjected to electrodeposition coating later with the electrodeposition liquid 60, the curved portion 50, which is partially coated with the sealer 40, is coated with the electrodeposition liquid 60 to have a double coating structure, thereby further inhibiting the sealer 40 from being exposed to the outside.

More specifically, based on the cross section, a start position of the curved portion 50 may be the upper side of the intermediate steel plate layer 21 immediately before the three-stage superimposed portion 30 is separated into the respective steel plate layers, and an end position of the curved portion 50 may be the upper side of the intermediate steel plate layer 21 where the upper steel plate layer 20 and the lower steel plate layer 22 are separated from the intermediate steel plate layer 21.

In this case, a width (a) of the cross section of the curved portion 50 may be about 2.5 mm, and a depth (b) of the cross section of the curved portion 50 may be about 0.25 mm. In addition, based on the type of vehicle, the curved portion 50 may desirably start from a portion (c) that is spaced apart from one end of the intermediate steel plate layer 21 by about 16.5 mm to about 17.5 mm, and the curved portion 50 may more desirably start from a portion (c) that is spaced apart from one end of the intermediate steel plate layer 21 by about 16.5 mm. Further, an application tolerance of the sealer 40 applied on the intermediate steel plate layer 21 and the curved portion 50 may be about 1.5 mm.

Figure 4:
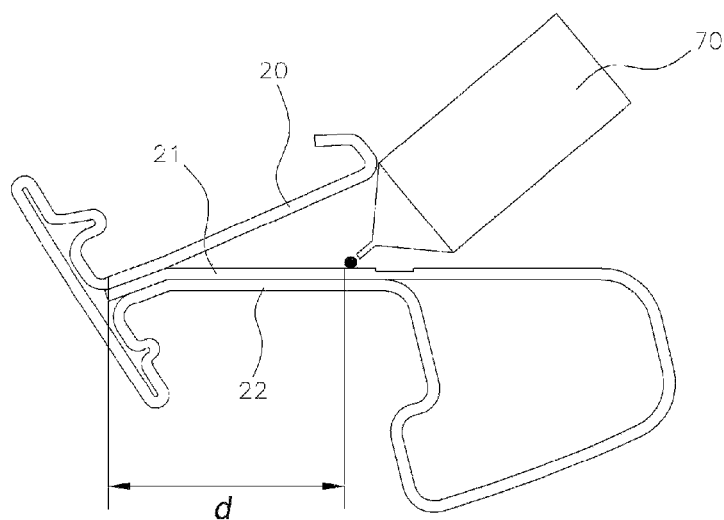
FIG. 4 is a cross-sectional view schematically illustrating part A-A' of the door frame for a vehicle in a process of applying a sealer during a roll forming process.

As illustrated in FIG. 4, in the second step, a position at which the sealer 40 is applied may be a position (d) that is spaced apart from one end at the upper side of the intermediate steel plate layer 21 by about 13 mm, and the application of the sealer 40 may be performed by using a sealer application gun 70. Here, an application rate of the sealer application gun 70 may be about 0.12 cc to about 0.15 cc, and a diameter of a nozzle of the sealer application gun 70 may be about 0.15 mm.

Figure 5:
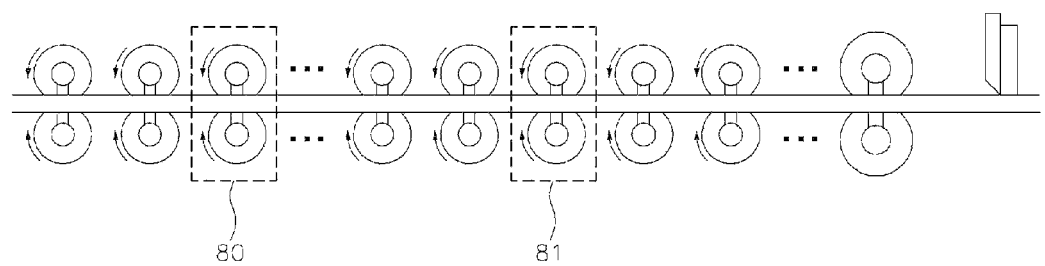
FIG. 5 is a schematic process diagram of the roll forming process.

Here, as illustrated in FIG. 5, during the roll forming process, the curved portion 50 may be formed at substantially at a third stage point 80, and during the roll forming process, the sealer may be applied at substantially at a 33rd stage point 81.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door frame for a vehicle, comprising:
   a three-stage superimposed portion which has a structure in which an upper steel plate layer, an intermediate steel plate layer, and a lower steel plate layer are superimposed, and in which a sealer for anti-corrosive performance is applied between the upper steel plate layer and the intermediate steel plate layer; and
   a curved portion which is formed at an upper side of the intermediate steel plate layer at a first end of the three-stage superimposed portion to prevent the applied sealer from being exposed to the outside.

2. The door frame of claim 1, wherein a cross section of the curved portion has a 'z,21' shape.

3. The door frame of claim 1, wherein a width (a) of a cross section of the curved portion is approximately 2.5 mm, and a depth (b) of the cross section of the curved portion is approximately 0.25 mm.

4. The door frame of claim 1, wherein the curved portion starts at a portion (c) that is spaced apart from a first end of the intermediate steel plate layer by approximately 16.5 mm to approximately 17.5 mm.

5. A method of manufacturing a door frame for a vehicle, the method comprising:
   a first step of forming a curved portion which prevents a sealer from being exposed to the outside by a roll forming process for manufacturing the door frame for the vehicle;
   a second step of applying the sealer onto an intermediate steel plate layer;
   a third step of forming a three-stage superimposed portion by allowing an upper steel plate layer and the intermediate steel plate layer to be attached to each other by the roll forming process so that the sealer, which is applied onto an upper portion of the intermediate steel plate layer, is compressed and widely applied between the upper steel plate layer and the intermediate steel plate layer;
   a fourth step of finishing forming the door frame for a vehicle by the roll forming process; and
   a fifth step of coating the formed door frame with an electrodeposition liquid.

6. The method of claim 5, wherein in the first step, a cross section of the curved portion is formed in a 'z,21' shape.

7. The method of claim 5, wherein in the first step, a width (a) of the cross section of the curved portion is 2.5 mm, and a depth (b) of the cross section of the curved portion is approximately 0.25 mm.

8. The method of claim 5, wherein in the first step, the curved portion starts at a portion (c) that is spaced apart from a first end of the intermediate steel plate layer by approximately 16.5 mm to approximately 17.5 mm.

9. The method of claim 5, wherein in the second step, a position at which the sealer is applied is a position (d) that is spaced apart from a first end at an upper side of the intermediate steel plate layer by approximately 13 mm.

10. The method of claim 5, wherein in the second step, the application of the sealer is performed by using a sealer application gun.

11. The method of claim 5, wherein in the second step, an application rate of the sealer is approximately 0.12 cc to approximately 0.15 cc.

* * * * *